350-392 SR CROSS REFERENCE SEARCH ROO
XR 3,312,957

April 4, 1967 H. FLEISHER ETAL 3,312,957

SIMPLIFIED ACCESS OPTICAL MEMORY

Filed Oct. 25, 1963 2 Sheets-Sheet 1

INVENTORS.
HAROLD FLEISHER
THOMAS J. HARRIS
EUGENE SHAPIRO

BY Paul D. Carmichael

ATTORNEY.

3312957
OR IN 365/121

United States Patent Office 3,312,957
Patented Apr. 4, 1967

3,312,957

SIMPLIFIED ACCESS OPTICAL MEMORY

Harold Fleisher, Thomas J. Harris, and Eugene Shapiro, Poughkeepsie, N.Y., assignors to International Business Machines Corporation, New York, N.Y., a corporation of New York Filed Oct. 25, 1963, Ser. No. 318,859
2 Claims. (Cl. 340—173)

This invention relates to the storage of information. In particular, this invention relates to the storage of binary information in an optical system in which the information can be retrieved at high speed without complex circuitry.

Light, in common with other high frequency electromagnetic radiation, has properties that are potentially very useful in data processing applications. One of these properties is the speed obtained, which is the fastest signal speed known in nature. Another property which is particularly valuable is the transmission characteristic of high frequency electromagnetic radiation. Such radiation does not substantially diffract around large objects and thus is transmitted without interference to nearby equipment. Yet, such radiation can be generated at a single source and intentionally separated at different locations to create a plurality of optical circuits.

Optical memories have the potentiality of being very simple since the basic requirements of such memories are a single radiation source and a single element for each bit of data retained. The light could be gated or directed to an optical detector of some kind. It is this simplicity, combined with the fast speed of high frequency electromagnetic radiation, which the art apparently has attempted to utilize effectively in the past. However, a truly efficient structure has not been attained by the prior art. In general the prior art has required in order to read from an optical memory a complex system of electrical driving lines and matrices to control these lines. The final device obtained was difficult and expensive to build and to maintain in operation; and the readout speed was limited by the complexity of the circuits required.

It is a particular object of this invention to provide an optical memory which can be sensed without complicated addressing circuitry.

It is a more general object of this invention to provide a less structurally complex optical memory.

It is a further object of this invention to provide an optical memory which can be interrogated sequentially with only a single interrogation signal.

It is another object of this invention to provide an optical memory which can be interrogated at higher speed and with interrogation equipment of simpler structure than previous memories.

In accordance with the invention an optical memory is provided by locating a memory substance at each point where a bit of data is to be stored, which memory substance is an electro-optic material such as Rochelle salt, barium titanate, or a similar material having electro-optic remanence at certain temperatures. The memory substances are caused to be at a temperature at which electro-optic remanence is exhibited so that an electrical signal temporarily impressed across the substance is retained for a usably long period of time as a property of the substance which will at least partially change the status of polarization of electromagnetic radiation passing through the substance. A first analyzer arrangement is provided to exclude light emerging from the memory when not in a preselected status of polarization. An electro-optic substance having no substantial electro-optic remanence is located in the optical path beyond the first analyzer and oriented to at least partially change radiation to the preselected status of polarization when an electric field is impressed across it. Electrical connections are provided to pulse this substance at individual locations each in an optical path with a single memory location. A second analyzer arrangement is provided to exclude radiation which has not been operated upon by the activated electro-optic substance having no remanence. Photosensitive means are located to respond to radiation emerging from the second analyzer.

In accordance with an important aspect of the specific embodiment, the electro-optic substance which does not display remanence is electrically bridged at different points by lines which are part of an electrical delay line. The bridged points are each in an optical path with a memory location. The memory is interrogated by pulsing the delay line with a sufficiently large pulse. This delay line scan modifies the optical paths associated with a different memory location serially as the pulse in the delay line proceeds down the delay line.

In accordance with a more limited aspect of the invention, a highly accurate timing system is provided by locating a second memory in the same environment as the first memory. Each data location in the second memory is in a condition which will pass a signal when scanned by its delay line scan. The delay lines of the two memories are pulsed in unison, and the signals from the second memory are used as timing signals. Changes in scan speed due to ambient conditions will be reflected automatically in the timing signal.

The foregoing objects, features, and advantages of the invention will be apparent from the following more particular description of a preferred embodiment of the invention, as illustrated in the accompanying drawings.

Figure 1:
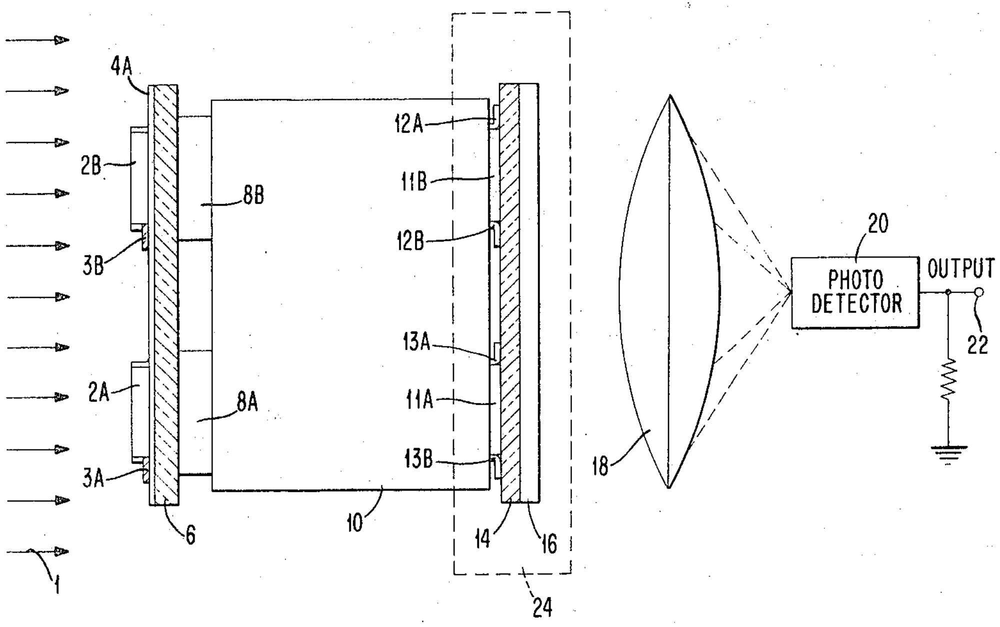
FIG. 1 is a system diagram showing how the memory operates with the read out technique to accomplish high speed interrogation with a minimum of interrogation circuitry.

So that the functioning of the memory will be clearly understood when the details of different structures of the memory are explained, reference is made to FIG. 1, which is a simplified diagram of the entire memory system. The memory is activated by a constant beam of collimated, monochromatic, linearly polarized light 1, which impinges upon the memory crystals 2A and 2B. Also shown in FIG. 1 are horizontal conductive selection leads 3A and 3B and a vertical conductive selection lead 4A. These leads will be explained more fully in connection with FIG. 2. For the purpose of understanding the entire system it will be assumed that the memory crystals 2A and 2B have had a signal representative of a binary one previously impressed across them and that they therefore will change the status of polarization of the portion of light 1 which passes through the crystals. The crystals 2A and 2B are mounted on a glass backing 6 for structural stability, and means, such as an opaque paint on the glass backing 6, are provided to exclude all light which does not emerge from a memory crystal such as 2A and 2B. The next elements in the optical path are analyzers 8A and 8B, each associated with a memory crystal and each oriented to exclude the light 1 unless its status of polarization has been changed by the memory crystals 2A and 2B. Thus, light continuously emerges from the analyzers 8A and 8B and other analyzers (not shown) in the entire system when the crystals 2A or 2B or other crystals (not shown) associated with a given analyzer retain a binary one. The remainder of the system shown in FIG. 1 facilitates high speed read out of this stored information.

A bundle of optical fibers 10 is shown schematically in FIG. 1 by a rectangular outline. These optical fibers improve the memory by forming optical conduits to convey light emerging from the analyzers to the remainder of the system. The optical fibers 10 channel emerging light to reduce interference between memory elements. The optical fibers 10 direct emerging light to each of the crystals 11A and 11B and other delay line crystals (not shown). The delay line crystals are oriented to change the polarization of the light 1 back to the original polarization it had before it passed through the memory crystals. The delay line crystals will be more fully explained below in connection with FIG. 4. They are bridged by conductive films 12A and 12B and 13A and 13B and mounted for structural support on a glass backing 14. An analyzer 16 is mounted on the other side of the glass backing 14 and is oriented to exclude any of the light 1 incident on the delay line crystals which is not changed in its status of polarization by the delay line crystals. A conventional lens 18 gathers all light emerging from the analyzer 16 and directs it to a photo detector 20. An output signal from the photo detector 20 appears on the output line 22, which is connected to the photo detector 20.

The temperature controlling means are shown in FIG. 1 by the dotted outline 24. As will be made fully clear below, it is necessary that the memory crystals 2A and 2B and other crystals (not shown) display an electro-optic remanence, while the delay line crystals 11A and 11B and other delay lines crystals (not shown) display no such remanence. This difference is obtained by a temperature control of the environment surrounding the crystals. Although any means to control temperature is well within the concept of this invention, the preferred means is to immerse the crystals in a fluid at the proper temperature. The dotted outline 24 represents a fluid jacket whereby the delay line crystals 11A and 11B and other crystals (not shown) are held in contact with a heating fluid. The structure shown is particularly applicable only in the preferred embodiment in which barium titanate is used both for the memory crystals 2A and 2B and other memory crystals (not shown) and for the delay line crystals 11A and 11B and other delay line crystals (not shown).

In this preferred embodiment the memory crystals have the desired remanence at room temperature and therefore only jacket 24 is required to raise the temperature of the delay line crystals to above 120° C., the temperature required to eliminate remanence in the delay line crystals. In alternative structures, however, a second liquid jacket surrounding the memory crystals 2A and 2B and other memory crystals (not shown) would be required so that a separate liquid heating or cooling agent could bring the memory crystals to a desired temperature while another separate liquid jacket could bring the delay line crystals 11A and 11B and other delay line crystals (not shown) to another desired temperature. It should also be noted that the optical fibers 10 perform a second useful function in that they optically connect the system in such a way that liquid jackets can be tightly fitted around desired areas.

To interrogate the memory a pulse is supplied to a delay line in the memory. A pulse maintained for a predetermined length of time propagates down the delay line and is at a different physical location at the different times. In the preferred embodiment each row makes up a separate delay line. The pulse causes crystal 11A of FIG. 1 and similar crystals (not shown) in that row to exhibit electro-optic properties as the pulse proceeds down the delay line transmission path. The analyzer 16 excludes all of the radiation passed by memory analyzers such as 8A and 8B and other memory analyzers (not shown) which has not been changed in its status of polarization by a delay line crystal 11A or a similar crystal (not shown) in the row. Thus, the only light passing out of the analyzer 16 to the photo detector 20 is the light which reached a delay line crystal after being changed in polarization status by the memory crystals such as 2A or other crystals (not shown) and further which is changed again in its status of polarization by an activated delay line crystal such as 11A or a similar crystal (not shown). Since the delay line crystals in a separate row are activated in series by the moving pulse on the delay line, an output will appear at a given time only for bits stored in the single memory crystal, which would be 2A or a similar crystal, associated with a single activated delay line crystal, which could be 11A or a similar crystal. By observing the time at which an output appears it will be known at which location in the memory the bit was stored. Since the transmission time down the delay line is quite fast, the memory interrogation is at high speed. The lens 18 images all of the pulses of outcoming light from the analyzer 16 to the photo detector 20, which responds to the received light in a manner well known in the art to give an electrical output pulse.

Figure 2:
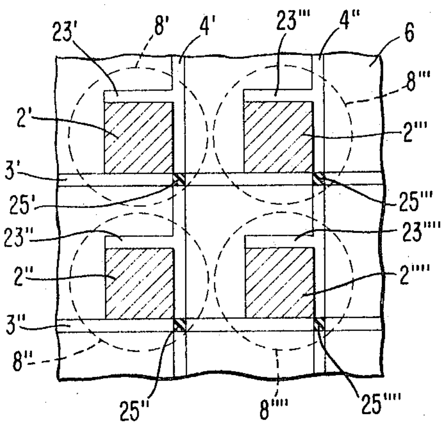
FIG. 2 is an expanded view of a portion of the memory used in FIG. 1, showing its construction and arrangement.

For a complete understanding of the memory used in this invention, reference is made to FIG. 2. FIG. 2 is an arbitrarily selected portion of a memory which, of course, contains a much larger number of elements than those shown. It will be observed that FIG. 2 illustrates a mosaic of memory crystals 2′, 2″, 2‴, and 2⁗. For the purpose of illustration in FIG. 1, memory crystals were shown and designated 2A and 2B. Since FIG. 2 is an arbitrarily selected portion of the memory, 2A and 2B in FIG. 1 could or could not be those crystals shown in FIG. 2. The memory crystals in FIG. 1 and FIG. 2 are all designated with the number 2 followed by a further designation so that it will be clear that all are memory crystals. It is, of course, essential to the invention that the crystals display electro-optic remanence when operated at certain temperatures.

Figure 3:
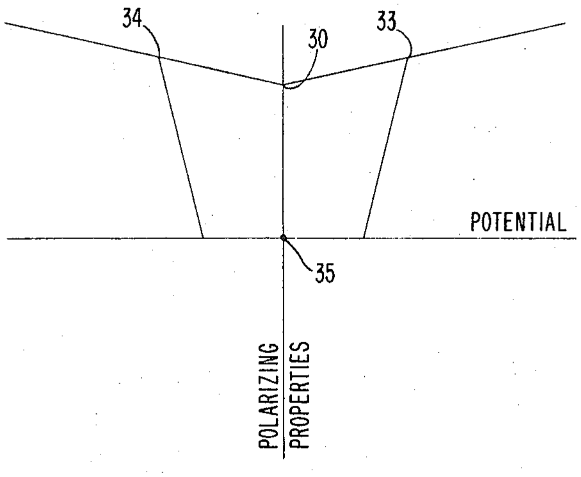
FIG. 3 is a diagram to illustrate the remanent characteristics of the materials used.

Reference is made to FIG. 3 in order to explain the electro-optic remanent characteristics of a material. At a temperature below the Curie temperature, a material with the type of remanence under consideration retains a condition of internal polarization for a substantial period of time in response to an electrical potential temporarily placed across it. When in this retained condition, the substance induces a change in the status of polarization of electromagnetic radiation passing through it. The material thus exhibits electro-optic remanence. FIG. 3 is a diagram indicating this for barium titanate. The abscissa in FIG. 3 represents potential temporarily impressed across the substance, and the ordinate in FIG. 3 is suggestive of the ability of the crystal to change the status of polarization of electromagnetic radiation passing through it. The point 30 illustrates the remanent points of a barium titanate crystal. In this invention the crystals are always driven past one of the points of saturation on the curve, shown at the points 33 and 34, and, therefore, when a data bit has been recorded on the crystal, the polarizing status of the crystal is at the point 30.

The ability of the electro-optic substance to change status of polarization, represented by the ordinate in FIG. 3, is somewhat different in character depending upon the substance used. Crystals such as Rochelle salt, $$KDP\ (KH_2PO_4)\ \text{and}\ ADP\ (NH_4H_2PO_4)$$

display a linear electro-optic effect which changes the status of polarization of transmitted light to one polarity direction after being driven to saturation in one direction and to an orthogonal polarity direction after being driven to saturation in an opposite direction. Therefore, circularly polarized light incident on such crystals in a memory of this invention can be caused to emerge linearly polarized in one of two mutually orthogonal directions, depending upon the state of the memory crystal at the time of transmission. In such an embodiment one of the directions of polarization would be considered the "one" state and the other direction of polarization would be considered the "zero" state. Crystals such as barium titanate, which are utilized in the preferred embodiment, display a quadratic electro-optic effect which will affect radiation in the same manner after being driven to saturation in either of two opposite directions. FIG. 3, showing saturation points 33 and 34, is illustrative of the quadratic electro-optic effect of barium titanate. Thus, in the preferred embodiment a "one" is stored by saturating the memory crystals in either direction and a "zero" is stored by the removal of internal polarization (by an alternating, decreasing voltage or by other means) to cause the substance to be at point 35 in FIG. 3, the intersection of the ordinate and the abscissa.

The orientation of the crystals in order to obtain a change in the status of polarization of radiation passing through the crystals is not critical, but the remanent electro-optic effect can be enhanced by properly orienting a given crystal. A KDP crystal would be oriented with the polarizing electric field and the direction of light propagation along the optic axis. Rochelle salt and barium titanate would be oriented to use the transverse electro-optic effect, where the polarizing electric field is at right angles to the direction of light propagation.

Reference is made once again to FIG. 2 where the structure utilized to read information into the memory is illustrated. Vertical conductive selection leads 4′ and 4″ form columns through the entire memory. Other vertical conductive selection leads (not shown) exist for each column in the memory and are connected to appropriate circuitry. Horizontal conductive selection leads 3′ and 3″ and other such leads (not shown) form rows through the entire memory. The vertical selection leads have laterally extending conductors 23′, 23″, 23‴, and 23⁗ connected to them to electrically bridge each of the crystals 2′, 2″, 2‴ and 2⁗ and other crystals (not shown) between one vertical conductive lead and one horizontal conductive lead. The memory crystals 2′, 2″, 2‴, and 2⁗ and other crystals (not shown) are in contact with the selection leads so that a strong transverse electric field will be impressed across one of them when an electrical potential is connected to one horizontal conductive lead and one vertical conductive lead. Insulators 25′, 25″, 25‴, and 25⁗ and other insulators (not shown) are situated to electrically separate the vertical conductive leads and the horizontal conductive leads where they cross.

To write information into the memory crystals, a preselected horizontal lead is chosen and a preselected vertical lead is chosen. The magnitude of the potentials required to switch a memory crystal to a remanent state depends upon the crystal used, whether the transverse or longitudinal electro-optic effect is utilized, and the switching speed desired. In general, all of the crystals discussed as examples in this specification can be switched in microseconds with approximately 200 volts when operated within 10 to 20° C. of their Curie temperature. A sufficient potential is impressed across the horizontal and vertical selection leads chosen for a short time to read information into the memory. The crystal takes on a retained internal polarizing capacity in accordance with the electro-optic remanence characteristics of the crystal as discussed in connection with the FIG. 3. In the preferred embodiment, those crystals which are to retain a binary one of information as distinguished from a zero are individually pulsed and take on a polarizing state.

The polarizing capacity does decay with the passage of time. However, the information in the memory can be scanned and restored in accordance with well known techniques if an extended period of memory is desired. The decay time in the electro-optic memory of this invention will be in the range of one to five minutes; depending upon the crystal used, ambient conditions, and similar parameters. The memory would, therefore, require recycling approximately every one to five minutes. Recycling is not necessary, of course, when the memory is used as intermediate storage location in a routine which will be accomplished in a short time.

To restate the function of the memory crystals 2′, 2″. 2‴. and 2⁗, reference is made once again to FIG. 1. Each memory crystal has a status created by the presence or absence of previous pulses on the selection leads. The crystals which are in a status representative of a binary one will orient the polarization of impinging light 1 such that the light will pass through the associated analyzer such as 8A or 8B. The light emerges in this manner at all times while the light source 1 is active. In the preferred embodiment the light 1 is linearly polarized and the memory crystals in a status representative of a binary zero do not affect this polarization. Light emerging from those crystals is absorbed by the analyzer such as 8A or 8B, which is associated with the memory crystal in a zero state. The memory is interrogated by the use of the delay line scan.

Figure 4:
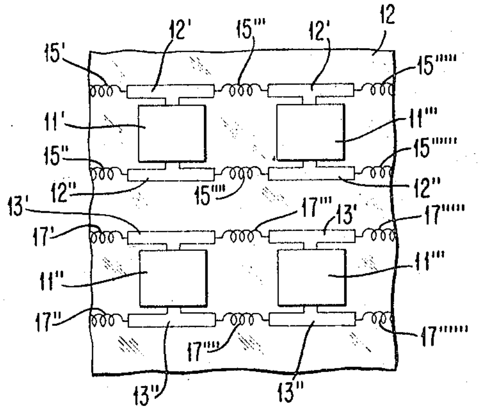
FIG. 4 is an expanded view of the delay line scan used in FIG. 1.

Reference is made to FIG. 4 where the delay line scan is illustrated in detail and the delay line crystals 11′, 11″, 11‴, and 11⁗ are shown. FIG. 4 is an arbitrarily selected portion of the entire delay line scan. The delay line crystals, designated 11A and 11B in FIG. 1 could be those shown in FIG. 4 or they could be other similar crystals in the delay lines. The crystals are composed of an electro-optic substance which does not exhibit remanence. In this specification the statement that a substance is electro-optic, without reference to remanence, is intended to distinguish the property of the material from that discussed above where electro-optic remanence was described. In the specific embodiment, crystals of the same composition as the memory crystals are used in the delay line, but they are operated at temperatures above their Curie temperature.

The crystals in each row are electrically separated by two inductive coils. For example, crystals 11′ and 11‴ are connected on one side to conductive film 12′ through inductive coil 15‴. On the opposite side crystals 11′ and 11‴ are connected to conductive film 12″ through inductive coil 15⁗. In the same manner crystals 11″ and 11⁗ are connected through coils 17‴ and 17⁗. As suggested by FIG. 4, the entire delay line scan is made up of a similar pattern of crystals connected by coils. A delay line is created because of the very high dielectric constant of the barium titanate crystals used when near its Curie temperature. As is well known, the separation of two conductors with a dielectric creates a transmission line. The inductive coils 15′–15″‴, 17′–17″‴ and similar coils (not shown) insert inductance into the delay line of the specific embodiment to increase the delay in the line to a more easily processed speed. The conductive films 12′ and 12″ are the two highly conductive portions of the two conductors of the delay line in one row and the conductive films 13′ and 13″ are the highly conductive portions of the two conductors of the delay line in a second row. Although the conductors 12′, 12″, 13′, 13″, and similar conductors (not shown) are discontinuous and electrically connected only by coils such as inductive coils 15′–15″‴, 17′–17″‴ and similar coils (not shown), the conductors 12′, 12″, 13′, 13″, and similar conductors (not shown) are given a single reference numeral for simplicity and to suggest the continuity of each conductor in forming one part of each delay line. Since the portion of the delay line shown in FIG. 4 is arbitrarily selected, the conductors 12′, 12″, 13′, 13″, could or could not be those conductors shown in FIG. 1 and denominated 12A, 12B, 13A, 13B. The delay line crystals 11′, 11‴ and other delay line crystals in a row (not shown) are located at different points along the line connected by the conductive films 12′ and 12″. The delay line row made up by conductive films 13′ and 13″ have a similar configuration.

An electrical pulse impressed across the conductive films 12′ and 12″ proceeds down the line and is at a different physical location at different time. In this manner the electro-optic property of each delay line crystal is activated at different times. Each delay line crystal is in an optical path with a single storage location in the memory. Light transmitted by the storage location of the memory is extinguished by the analyzer 16 (FIG. 1) until oriented by an activated delay line crystal. A sequential scan of the memory crystals in a single row is thus accomplished under the control of pulses into the delay lines.

As the dielectric constant of the substance in the delay line approaches zero, the pulse propagation speed down the delay line can be caused to approach the velocity of light. The delay line scan can be modified to utilize this property, and the speed of interrogation of memories using this invention can in that manner be designed to be extremely high.

The Curie temperature, and thus whether the substances used in the memory and the delay line to achieve the desired states of remanence and no remanence are heated or cooled, is a property of the crystals used. For example KDP crystals used in the memory would be cooled to approximately 100° K., and, if such crystals were used on the delay line, they would be operated at 140° K. or above. Rochelle salt operates near room temperature, with the memory crystals requiring cooling to 20°C. and the delay line crystals requiring heating to 30° C. In the case of deuterated KDP ($KD_2PO_4$), the memory crystals must be cooled to at least 185° K., and the delay line crystals must be at 230° K. or above. As discussed above, the desired operating temperatures can be achieved by immersing the memory and delay line crystals in separate fluids which are at the proper temperature. The optical fibers couple the memory with the delay line and facilitate the separation of the liquid jackets which establish the temperatures.

Figure 5:
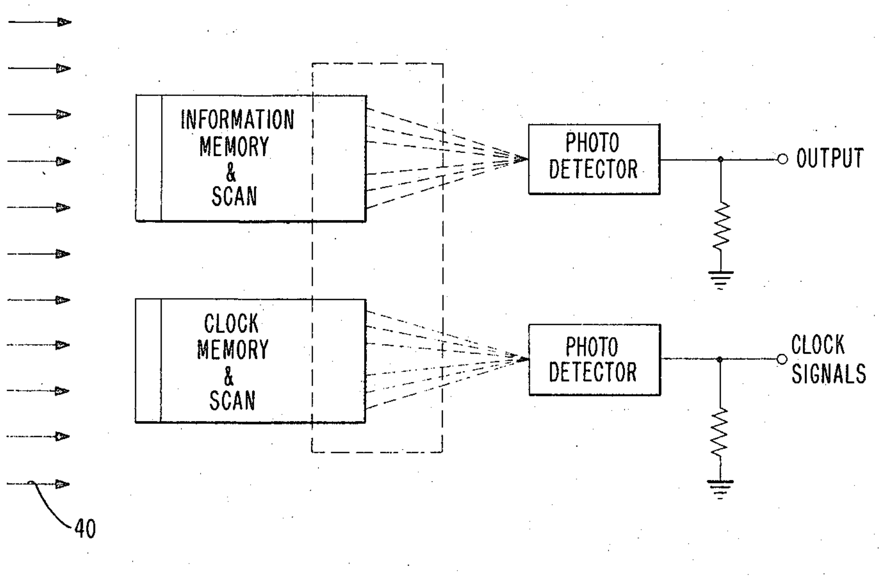
FIG. 5 illustrates the system used to obtain highly accurate timing for an optical memory.

In the preferred embodiment timing is extracted by a second memory identical in structure and environment to the first. Reference is made to FIG. 5. The second memory, the clock memory, is distinguished from the information memory in that it contains a bit indication at every storage location. Light 40 impinges upon both memories. By simply pulsing the two delay line scans simultaneously with the same pulse a signal is caused to appear at the output of the clock memory at each data time. Since the change of the scan time of the information memory due to ambient conditions will also occur identically in the scan time of the clock memory, the clock signals are highly accurate representations of the locations of the scan in the information memory.

It should be clear that a single delay line scan can serve the entire memory. Also, when a scan is initiated at one end of a delay line, it is not necessary to actually observe information until the pulse in the delay reaches those positions which are of interest. Any of many known logical techniques could be used to open a gate when a delay line scan reaches a desired location.

While the invention has been particularly shown and described with reference to preferred embodiments thereof, it will be understood by those skilled in the art that various changes in form and details may be made therein without departing from the spirit and scope of the invention.

We claim:

1. An optical memory which is activated by a beam of polarized radiation, comprising:

a plurality of electro-optical memory elements located in the path of said radiation, each said memory element displaying electro-optical remanence;

read-in means for reading information into said memory elements, said read-in means including a plurality of mutually perpendicular conductive means each of which electrically bridges a single memory element;

first analyzer means spaced from said memory elements in a direction away from the source of said radiation, and oriented to exclude radiation of a preselected polarity;

a plurality of second electro-optical substances having no electro-optical remanence, said plurality being spaced from said first analyzer means in a direction away from the source of said radiation, each said substance being optically coupled with a different one of said memory elements; and oriented to change radiation to said preselected polarity when activated;

means to activate each of said second electro-optical substances individually;

fiber optic means for coupling in parallel the information contained in said memory elements to said corresponding second electro-optical substances when said memory elements are illuminated by said radiation; and for reducing interference between memory elements;

second analyzer means oriented to exclude radiation which is not in the status of polarization induced by said second electro-optical substances when activated; and photosensitive means to observe radiation emerging from said second analyzer means.

2. An optical memory which is activated by a beam of polarized radiation, comprising:

a plurality of discrete areas each of which is occupied by a stably mounted crystal of an electro-optical substance having remanence;

first analyzer means spaced from said memory elements in a direction away from the source of said radiation and oriented to exclude radiation of a preselected polarity, said analyzer means being comprised of a plurality of analyzer means each of which is optically associated with a different one of said discrete areas;

readout means spaced from said analyzer means in a direction away from the source of said radiation for observing radiation emerging from said analyzer means;

fiber optic means for coupling in parallel the information contained in said crystals to said readout means, and for reducing interference between said crystals, and second analyzer means oriented to exclude radiation which is not in the status of polarization induced by said read-out means.

References Cited by the Examiner

UNITED STATES PATENTS

| | | | |
|---|---|---|---|
| 2,928,075 | 3/1960 | Anderson | 340—173.2 |
| 2,936,380 | 5/1960 | Anderson | 250—225 |
| 3,027,806 | 4/1962 | Koelsch | 88—61 |
| 3,046,529 | 7/1962 | Briggs | 340—173.2 |
| 3,102,998 | 9/1963 | Staehler | 340—173 |
| 3,107,344 | 10/1963 | Baker | 340—173 |
| 3,150,356 | 9/1964 | Newman | 340—174 |
| 3,155,944 | 11/1964 | Oberg | 340—173 |

References Cited by the Applicant

UNITED STATES PATENTS 3,069,973 12/1959 Ames.

BERNARD KONICK, *Primary Examiner.*

IRVING L. SRAGOW, R. G. LITTON, T. W. FEARS, *Assistant Examiners.*